US010025329B2

(12) United States Patent
Slaby et al.

(10) Patent No.: US 10,025,329 B2
(45) Date of Patent: Jul. 17, 2018

(54) METHOD AND APPARATUS FOR ADJUSTING PORTABLE ELECTRONIC DEVICE OPERATION BASED ON AMBIENT TEMPERATURE

(71) Applicant: Google Technology Holdings LLC, Mountain View, CA (US)

(72) Inventors: Jiri Slaby, Buffalo Grove, IL (US); Morris B. Bowers, Grayslake, IL (US); Itisha C. Deokar, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 895 days.

(21) Appl. No.: 14/024,050

(22) Filed: Sep. 11, 2013

(65) Prior Publication Data

US 2015/0057830 A1 Feb. 26, 2015

Related U.S. Application Data

(60) Provisional application No. 61/868,104, filed on Aug. 21, 2013.

(51) Int. Cl.
*G05D 23/19* (2006.01)
*G06F 1/20* (2006.01)
*G06F 1/32* (2006.01)

(52) U.S. Cl.
CPC ......... *G05D 23/1917* (2013.01); *G06F 1/206* (2013.01); *G06F 1/324* (2013.01);
(Continued)

(58) Field of Classification Search
CPC ... G05D 23/1917; G06F 1/206; G06F 1/3241; G06F 1/3206; Y02B 60/1217
(Continued)

(56) References Cited

U.S. PATENT DOCUMENTS 6,081,901 A * 6/2000 Dewa ................ G06F 1/3203
712/233
6,454,362 B1 9/2002 Katsui et al.
(Continued)

FOREIGN PATENT DOCUMENTS

JP 2008225590 A 9/2008
JP 2009200815 A 9/2009
(Continued)

OTHER PUBLICATIONS

IP.com Journal, "Adaptive Thermal Management of a Mobile Computer Based on External Tactile Thermal Sensory Data" Sep. 21, 2009, pp. 2.*
(Continued)

*Primary Examiner* — Miranda M Huang
*Assistant Examiner* — Olvin Lopez Alvarez
(74) *Attorney, Agent, or Firm* — Colby Nipper (57) ABSTRACT

A method and apparatus adjust portable electronic device operation based on ambient temperature. A user input of a desired performance mode of a portable electronic device can be received. An ambient temperature in an environment surrounding the portable electronic device can be determined. A device temperature mitigation threshold value can be set based on the ambient temperature and based on the desired performance mode. Portable electronic device operation can be adjusted based on the portable electronic device temperature exceeding the device temperature mitigation threshold value.

20 Claims, 8 Drawing Sheets

(52) U.S. Cl.
CPC ........ *G06F 1/3206* (2013.01); *Y02B 60/1217* (2013.01); *Y02D 10/126* (2018.01)

(58) Field of Classification Search
USPC .................................................. 700/276, 300
See application file for complete search history.

(56) References Cited

U.S. PATENT DOCUMENTS

| | | | |
|---|---|---|---|
| 8,255,004 B2 | 8/2012 | Huang et al. | |
| 8,374,730 B2 | 2/2013 | Conroy et al. | |
| 8,452,463 B2 | 5/2013 | Cox et al. | |
| 2005/0140385 A1* | 6/2005 | Lee ..................... | G06F 1/206 324/750.01 |
| 2005/0204175 A1* | 9/2005 | Burton ................. | G06F 1/206 713/300 |
| 2005/0212781 A1* | 9/2005 | Clapper ............... | G06F 1/181 345/184 |
| 2007/0027580 A1 | 2/2007 | Ligtenberg et al. | |
| 2007/0067136 A1* | 3/2007 | Conroy ................ | G06F 1/206 702/130 |
| 2009/0031153 A1* | 1/2009 | Bahali ................. | G06F 1/3203 713/310 |
| 2009/0171513 A1* | 7/2009 | Tsukazawa .......... | G06F 1/203 700/300 |
| 2011/0172839 A1* | 7/2011 | Brown ................. | B60L 3/0069 700/292 |
| 2012/0078959 A1* | 3/2012 | Cho ..................... | G05B 15/02 707/770 |
| 2012/0182687 A1 | 7/2012 | Dighde et al. | |
| 2012/0271480 A1 | 10/2012 | Anderson et al. | |
| 2012/0272078 A1 | 10/2012 | Anderson et al. | |
| 2012/0272086 A1* | 10/2012 | Anderson ............ | G06F 1/206 713/340 |
| 2013/0090888 A1* | 4/2013 | Anderson ............ | G06F 1/203 702/130 |
| 2013/0179000 A1* | 7/2013 | Cox ..................... | G06F 1/1677 700/300 |
| 2013/0222959 A1* | 8/2013 | Sawyers ............... | H02H 7/20 361/93.8 |
| 2013/0285587 A1* | 10/2013 | Takemoto ............ | B62D 5/0496 318/473 |
| 2013/0289792 A1* | 10/2013 | Cheng ................. | G06F 1/206 700/300 |
| 2014/0006818 A1* | 1/2014 | Doshi .................. | G06F 1/3203 713/320 |
| 2014/0082543 A1* | 3/2014 | Kim .................... | G06F 1/3203 715/771 |
| 2014/0163765 A1* | 6/2014 | Jain .................... | G06F 1/206 700/300 |
| 2014/0225561 A1* | 8/2014 | Hasegawa ........... | B60L 11/1816 320/108 |
| 2014/0236380 A1* | 8/2014 | Alton .................. | G06F 1/206 700/299 |
| 2014/0240031 A1* | 8/2014 | Vadakkanmaruveedu ................ G06F 1/206 327/512 |
| 2014/0371944 A1* | 12/2014 | Vadakkanmaruveedu ................ G01K 7/16 700/299 |

FOREIGN PATENT DOCUMENTS

| | | | | |
|---|---|---|---|---|
| KR | 10-2004-0023016 | | 3/2004 | |
| TW | 201317737 | * | 5/2013 | .............. G06F 1/08 |
| WO | 1988007267 A1 | | 9/1988 | |
| WO | 2015026549 A1 | | 2/2015 | |

OTHER PUBLICATIONS

Torres, "Pentium 4 Thermal Throttle", 2005, pp. 2.*
Strigo et al., "Effect of Ambient Temperature on Human Pain and Temperature Perception" 2000 American Society of Anesthesiologists, Inc., Anesthesiology, V92, No. 3, Mar. 2000, pp. 699-707.
Bellamkonda et al., "Electronic System and Method for Thermal Management Therin Taking Into Account Solar Thermal Loading" U.S. Appl. No. 13/928,405, filed Jun. 27, 2013, 42 pages.
International Search Report and Written Opinion issued in PCT/US2014/050501, dated Dec. 18, 2014, 11 pages.
Shillcutt, Kimberly J.: "Solar Based Navigation For Robotic Explorers", A Thesis Submitted in Partial Fulfilment of the Requirements OFR the Degree of Doctor of Philosophy in the Robotics Institute of Carnegie Mellon University, 2000, all pages, pp. 155.
Headlines, Acura Media Newsroom—RDX—2013 RDX—Interior, 2013 RDX—Interior, Text Only 2013 Acura RDX technical document.doc, Mar. 26, 2012, www.hondanews.com/channels/acura-automobiles-rdx/releases/2013-rdx-interior, downloaded from internet: Mar. 15, 2013, all pages. pp. 3.
"Foreign Office Action", Japanese Application No. 2016536292, 4 pages, dated Jan. 30, 2018.

* cited by examiner

METHOD AND APPARATUS FOR ADJUSTING PORTABLE ELECTRONIC DEVICE OPERATION BASED ON AMBIENT TEMPERATURE

BACKGROUND

1. Field

The present disclosure is directed to a method and apparatus for adjusting portable electronic device operation based on ambient temperature. More particularly, the present disclosure is directed to adjusting portable electronic device operation based on an ambient temperature in an environment surrounding the portable electronic device.

2. Introduction

Presently, portable electronic devices employ thermal mitigation to prevent the surfaces of the devices from becoming uncomfortably hot. The thermal mitigation is initiated at a fixed temperature mitigation limit. Thus, the thermal mitigation is always initiated at the same device temperature limit regardless of ambient temperature in an area surrounding the device.

Unfortunately, the fixed temperature mitigation limit reduces device performance too soon for a high performance user, especially in a high ambient temperature environment. For example, a high performance user uses processing intensive applications and multiple applications that drive the device harder for longer time periods. The fixed temperature mitigation limit reduces device performance, such as operation speed, even though the performance users may be willing to tolerate a hotter device in order to have higher performance. Furthermore, the fixed mitigation temperature limit results in users perceiving an unpleasantly hot device surface at elevated ambient temperatures, even if the same device surface temperature is not perceived as unpleasant or hot at normal ambient temperatures. For example, many users desire device surface temperatures maintained below an unpleasantness level. However, users perceive a typically acceptable device surface temperature as being unpleasantly hot at elevated ambient temperatures, such as during the summer or in countries or regions with warm climates, because the fixed temperature mitigation limit is set for a typically comfortable ambient temperature. Additionally, the fixed temperature mitigation limit causes a device to reduce its speed and enter thermal shutdown quicker at elevated ambient temperatures, which negatively impacts the user's experience.

Thus, there is a need for a method and apparatus for adjusting portable electronic device operation based on ambient temperature.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus that adjust portable electronic device operation based on ambient temperature. A user input of a desired performance mode of the portable electronic device can be received. An ambient temperature in an environment surrounding the portable electronic device can be determined. A device temperature mitigation threshold value can be set based on the ambient temperature and based on the desired performance mode. Portable electronic device operation can be adjusted based on the portable electronic device temperature exceeding the device temperature mitigation threshold value.

Figure 1:
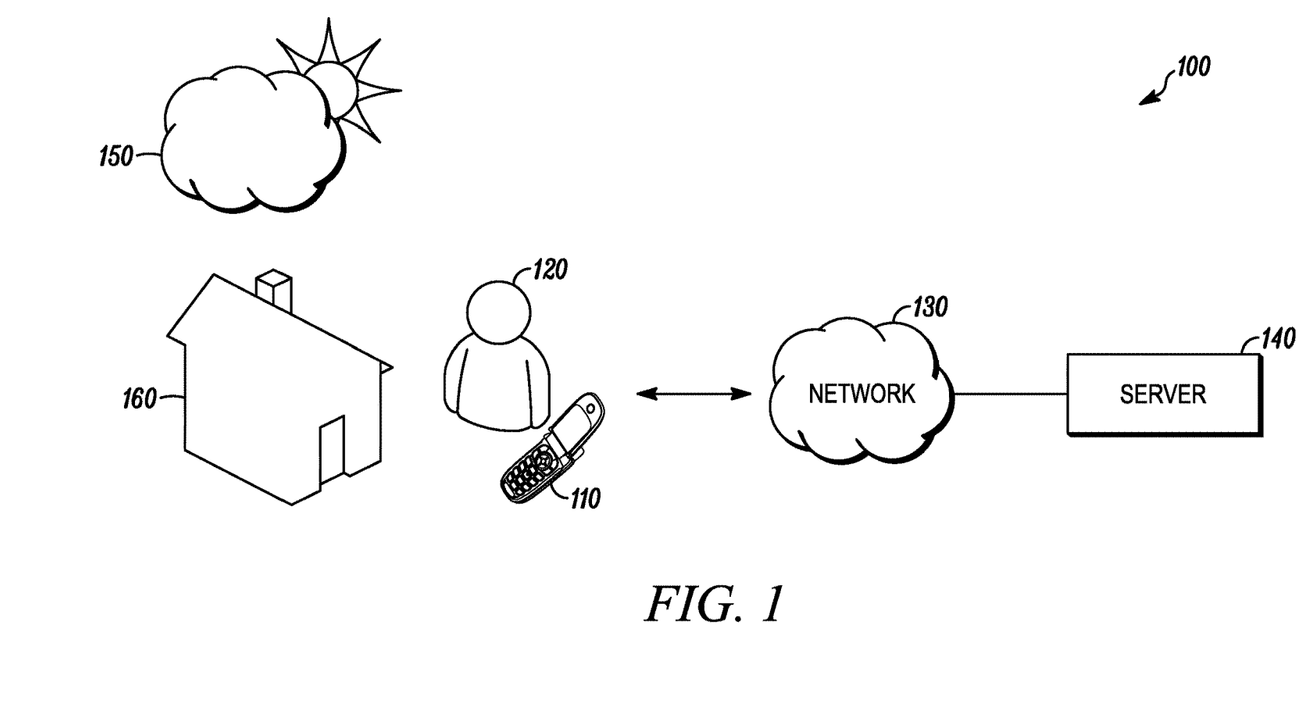
FIG. 1 is an example block diagram of a system according to a possible embodiment.

FIG. 1 is an example block diagram of a system 100 according to a possible embodiment. The system 100 can include an apparatus 110, an apparatus user 120, a network 130, a server 140, weather 150, and an indoor location 160. The apparatus 110 can be a portable electronic device. For example, the apparatus 110 can be a portable wireless communication device, a selective call receiver, a cellular telephone, a smartphone, a personal digital assistant, a camera, a laptop computer, a tablet computer, or any other portable electronic device. The apparatus 110 can communicate with the network 130, the server 140, and other devices using wireless communication signals, such as cellular or wireless local area network communication signals, as well as electrical communication signals, optical communication signals, or other communication signals. The weather 150 and the indoor location 160 can be environments that influence an ambient temperature surrounding the apparatus 110. The server 140 can be connected to the network 130. The server 140 may be located at a weather service provider, at a business, at a home, or anywhere else on the network 130. The network 130 may include any type of network that is capable of sending and receiving communication signals. For example, the network 130 may include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a packet-based data network, the Internet, an intranet, a wireless wide area network, a wireless local area network, and other communications systems. The network 130 may include more than one network and may include a plurality of different types of networks. Thus, the network 130 may include a plurality of data networks, a plurality of telecommunications networks, a combination of data and telecommunications networks, and other communication systems capable of sending and receiving communication signals.

In operation, the apparatus 110 can receive a user input of a desired performance mode of the apparatus 110. The apparatus 110 can determine an ambient temperature in an environment surrounding the apparatus 110. The apparatus 110 can set an apparatus temperature mitigation threshold value based on the ambient temperature and based on the desired performance mode. The apparatus 110 can determine an apparatus temperature has exceeded the apparatus temperature mitigation threshold value. The apparatus 110 can adjust its operation based on the apparatus temperature reaching or exceeding the apparatus temperature mitigation threshold value.

For example, the apparatus 110 can perform adaptive thermal mitigation based on an ambient temperature and based on different user modes of operation, such as a performance user mode, a typical user mode, a comfort user mode, and other modes of operation. To elaborate on some examples, the apparatus 110 can have a comfort mode for a typical user where apparatus surface temperature mitigation can be adapted based on an elevated ambient temperature $T_{amb}$ to ensure optimum apparatus surface temperature comfort. In the comfort mode, adaptive surface temperature mitigation can start to incrementally decrease apparatus power, such as processor voltage or frequency, to maximize use time to extend apparatus usability before reaching critical limits, such as battery charge or discharge temperature limits. The ambient temperature $T_{amb}$ can be determined based on the apparatus location and temperature mitigation can be adjusted accordingly. For example, a temperature mitigation limit or threshold $T_{lim}$ can start to decrease at elevated ambient temperatures $T_{amb}$ to assure a comfortable device surface temperature. The apparatus 110 can also have a performance mode. In the performance mode, the apparatus 110 can override the comfort mode by using an elevated temperature mitigation threshold $T_{lim}$, which can allow the apparatus 110 to run with an elevated surface temperature $T_{sur}$. The elevated mitigation threshold $T_{lim}$ can be based on the elevated ambient temperature $T_{amb}$. The overriding of one performance mode with another performance mode can be permanent, temporary, instant, or gradual.

When the apparatus 110 is outdoors, the ambient temperature $T_{amb}$ can be identified using global positioning system information, using cellular triangulation positioning, using weather service information, using Google Now™ information, using sensors on the apparatus 110, using indium tin oxide thermocouples, using thermal infrared sensors, using touchscreen sensors, and using other information that identifies an ambient temperature. For example, the apparatus 110 can determine its position, such as its location, and the apparatus 110 can use a weather application to determine the ambient temperature for that location. Apparatus processes can be adjusted for the ambient temperature and for human perception of the surface temperature of the apparatus 110. Adjustments for human perception can take into consideration the time duration the apparatus 110 was in a given environment with a certain ambient temperature.

The apparatus 110 can also determine that it is indoors, such as when entering the indoor location 160, based on global positioning system information, based on network signals, based on proximity sensors, based on indoor navigation systems, and based on other information. When indoors, the apparatus 110 can transition to indoor navigation, such as by using wireless local area network triangulation or trilateration. The apparatus 110 can determine ambient temperature based on the indoor location, such as by using a typical indoor environment temperature, such as 25 C, as the ambient temperature $T_{amb}$. The apparatus 110 can also use additional information, such as map information, air conditioning location knowledge, sensors, temperatures sensors, or other information, to determine whether the indoor location has climate control. Thus, the apparatus 110 can determine whether or not the ambient temperature is a typical indoor temperature based on additional information. For example, the apparatus 110 can determine the indoor location 160 does not have air conditioning, based on an atypical rise in the apparatus temperature. To elaborate on this example, after the apparatus 110 assumes a comfortable indoor temperature of 25 C, it can operate its processor at a high speed. Then, the apparatus 110 may then detect its processor is operating at a higher temperature than normal for the assumed indoor temperature. A processor thermistor, a sensor, or other apparatus elements can detect the high processor temperature. After detecting the high processor temperature, the apparatus 110 can determine the ambient temperature is higher than a normal ambient temperature and can use other methods, such as sensor readings, to determine the ambient temperature, and can adjust its operation based on the elevated temperature and based on a selected performance mode.

Figure 2:
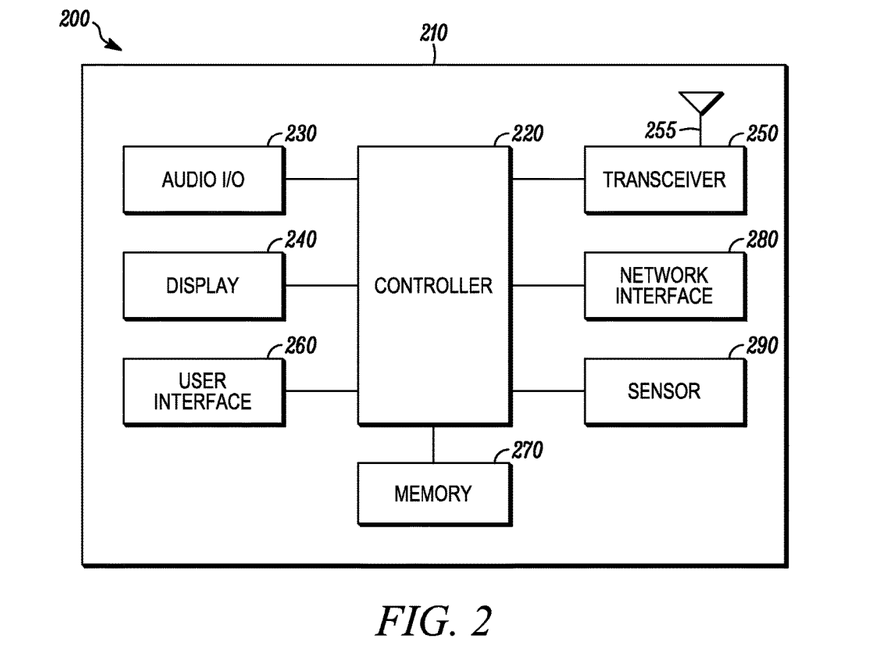
FIG. 2 is an example block diagram of a portable electronic device according to a possible embodiment.

FIG. 2 is an example block diagram of a portable electronic device 200, such as the apparatus 110, according to a possible embodiment. The portable electronic device 200 can include a housing 210, a controller 220 within the housing 210, audio input and output circuitry 230 coupled to the controller 220, a display 240 coupled to the controller 220, a transceiver 250 coupled to the controller 220, an antenna 255 coupled to the transceiver 250, a user interface 260 coupled to the controller 220, a memory 270 coupled to the controller 220, a network interface 280 coupled to the controller 220, and at least one sensor 290 coupled to the controller 220. The portable electronic device 200 can perform the operations described in the disclosed embodiments.

The display 240 can be a Liquid Crystal Display (LCD), a bistable display, a Light Emitting Diode (LED) display, an Organic Light-Emitting Diode (OLED) display, a plasma display, a projection display, a touch screen, or any other device that displays information. The transceiver 250 may include a transmitter and/or a receiver. The audio input and output circuitry 230 can include a microphone, a speaker, a transducer, or any other audio input and output circuitry. The user interface 260 can include a keypad, a keyboard, buttons, a touch pad, a joystick, a touch screen display, another additional display, or any other device useful for providing an interface between a user and an electronic device.

The network interface 280 can be a universal serial bus port, an Ethernet port, an infrared transmitter/receiver, an IEEE 1394 port, or any other interface that can connect an apparatus to a network or computer and that can transmit and receive data communication signals. The memory 270 can include a random access memory, a read only memory, an optical memory, a subscriber identity module memory, a flash memory, a removable memory, a hard drive, a cache, or any other memory that can be coupled to a portable electronic device.

The portable electronic device 200 or the controller 220 may implement any operating system, such as Microsoft Windows®, UNIX, or LINUX, Android, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 270 or elsewhere on the portable electronic device 200. The portable electronic device 200 or the controller 220 may also use hardware to implement operations. For example, the controller 220 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 220 may be any controller or processor device or devices capable of operating an electronic device and implementing the disclosed embodiments.

The sensor 290 can be a temperature sensor, a thermometer, an infrared sensor, an internal sensor, an external sensor, a thermal sensor, a thermocouple, an external thermal sensor, such as a thermocouple, a plurality of similar and/or different types of sensors, or any other sensor that can determine a temperature, such as a device temperature or an ambient temperature in the environment surrounding the portable electronic device 200. The sensor 290 can be an internal sensor and the ambient temperature can be determined by inferring the ambient temperature based on a sensed internal temperature or other sensed information that can reflect an ambient temperature being atypical. The ambient temperature can also be determined by averaging or weighted averaging temperature values from sensors and/or with temperature values from services, such as weather services. Also, some temperature values may be overridden if other values are considered more accurate.

In operation, a user input, such as the user interface 260, can receive a user input of a desired performance mode of the portable electronic device 200. For example, the user input can be selected from performance mode user input options including a first performance mode and a second performance mode. The first performance mode can set a first device temperature mitigation threshold value based on the ambient temperature and based on the first performance mode. The second performance mode can set a second temperature mitigation threshold value for a device based on the ambient temperature and based on the second performance mode. The second device temperature mitigation threshold value can be higher than the first device temperature mitigation threshold value. The first performance mode can be a comfort mode, a typical mode, an energy saving mode, a low heat mode, or other performance mode. The second performance mode can be a high performance mode, a high heat tolerance mode, or other performance mode. The performance mode user input options can also include additional performance modes. The user input can override a comfort mode to operate the portable electronic device 220 with an elevated device surface temperature.

According to a possible implementation, the performance mode user input options can include a performance mode temperature option based on a desired device surface temperature of the portable electronic device 200. The desired device surface temperature can be a user acceptable surface temperature, such as based on a user indication of acceptance of the surface temperature. For example, a user may indicate a desire to allow the device to run hotter than a typical temperature setting. The desired device surface temperature may be based on general surface temperature perception, such as cool, warm, comfortable, hot, or other general surface temperature perceptions. The performance mode temperature may also be a specific temperature setting, such as 48° C., 50° C., or other useful specific temperature setting selectable by a user. The performance mode temperature option can be presented as information along with other option information. For example, a high performance mode option can include the performance mode temperature option by informing a user that the high performance mode results in a higher surface temperature of the portable electronic device. The performance mode temperature option may also be presented as a message indicating the device 200 will be entering or has entered a temperature mitigation performance mode with an elevated surface temperature, and offer a user an option to operate the device with the elevated temperature or stay in a standard lower temperature mode with some performance impact.

The controller 220 can determine an ambient temperature in an environment surrounding the portable electronic device 200. The controller 220 can set a device temperature mitigation threshold value based on the ambient temperature and based on the desired performance mode. For example, the controller 220 can determine the ambient temperature is outside a range of normal, such as comfortable, ambient temperature values. The controller 220 can then set a device temperature mitigation threshold value by reducing the device temperature mitigation threshold value if the ambient temperature is outside the range of normal ambient temperature values. To elaborate, a user may perceive a typically comfortable portable electronic device surface temperature at normal ambient temperatures as an uncomfortably hot surface temperature at elevated or reduced ambient temperatures and the device temperature mitigation threshold value can be reduced accordingly. According to a possible implementation, the device temperature mitigation threshold value may be reduced if the ambient temperature is above the ambient temperature threshold, as a user may perceive a typically comfortable surface temperature as an uncomfortably hot surface temperature at ambient temperatures higher than normal ambient temperatures. According to another possible implementation, the device temperature mitigation threshold value may be reduced if the ambient temperature is below the ambient temperature threshold as a user may perceive a typically comfortable surface temperature as an uncomfortably hot surface temperature at ambient temperatures lower than normal ambient temperatures. The portable electronic device 200 can utilize ambient temperature threshold values that can include a high ambient temperature threshold value and a low ambient temperature threshold value so that the portable electronic device surface temperature is adjusted when the ambient temperature is outside of a range of normal ambient temperatures. Normal ambient temperatures can be comfortable ambient temperatures, such as within a range of temperatures surrounding 25 degrees C., and the ambient temperature threshold and/or the device temperature mitigation threshold value can be set by a user based on temperatures that the user considers acceptable. The ambient temperature threshold and/or the device temperature mitigation threshold value can also be set as a default values based on temperatures that are considered comfortable, such as based on studies, surveys, research, user feedback, or other information. A user can adjust the default values.

The controller 220 can determine a portable electronic device temperature has exceeded the device temperature mitigation threshold value. The controller 220 can adjust portable electronic device operation based on the portable electronic device temperature exceeding the device temperature mitigation threshold value. For example, the controller 220 can adjust portable electronic device operation by reducing an operating frequency of the portable electronic device. Reducing an operating frequency can include reducing a primary processor operating frequency, reducing an operating frequency of all components of the entire portable electronic device, and/or reducing operating frequencies of a subset of components of the portable electronic device. Other portable electronic device operation functions can be adjusted based on the portable electronic device temperature exceeding the temperature mitigation threshold value. For example, selected portable electronic device applications, other software, hardware, and/or other operations can be disabled or adjusted based on the portable electronic device temperature exceeding the temperature mitigation threshold value. As further examples, operating voltages and/or operating currents of components of the portable electronic device 200 can be adjusted and other operations of the portable electronic device 200 can be adjusted based on the portable electronic device temperature exceeding the temperature mitigation threshold value.

According to a possible embodiment, the controller 220 can determine a position, such as a location, of the portable electronic device 220 and can determine the ambient temperature in the environment surrounding the portable electronic device 220 based on the determined position of the portable electronic device 220. For example, the controller 220 can determine the portable electronic device position using global positioning system signals, using wireless network trilateration or triangulation, using deduced reckoning, or using other methods for determining the portable electronic device position. The controller 220 can retrieve ambient temperature information from a weather service or other service based on its position. The controller 220 can also determine the portable electronic device 200 is indoors based on received or non-received communication signals and can assume an indoor ambient temperature and/or can obtain other information to determine the indoor ambient temperature. For example, the controller 220 can determine the ambient temperature in the environment surrounding the portable electronic device is an indoor ambient temperature if the portable electronic device is indoors. The ambient temperature can also be determined using the at least one sensor 290, using sensors coupled to the portable electronic device 200, using received signals that provide ambient temperature information, or using other methods for determining ambient temperatures. The ambient temperature can also be determined based on operating temperatures detected within the portable electronic device 200.

According to a possible embodiment, the portable electronic device 200 can receive a user input of a desired performance mode of the portable electronic device 200. The desired performance mode can indicate a desired processing power of the portable electronic device 200. The portable electronic device 200 can determine that an ambient temperature in an environment surrounding the portable electronic device is outside of a range of ambient temperature values, such as a defined range of ambient temperature values. The portable electronic device 200 can set a device surface temperature mitigation threshold value based on the ambient temperature values being outside the range of ambient temperature values and based on the desired performance mode. The portable electronic device 200 can determine a portable electronic device surface temperature is greater than the device surface temperature mitigation threshold value. The surface temperature can be a temperature on the exterior of the portable electronic device, such as a temperature of the housing 210, a temperature of the display 240, such as a touch screen display, a temperature of the user interface 260, or any other surface temperature of the portable electronic device 200 that a user touches when using the portable electronic device 200. The portable electronic device 200 can adjust its operation to reduce the portable electronic device surface temperature based on the portable electronic device surface temperature being greater than the device surface temperature mitigation threshold value.

Figure 3:
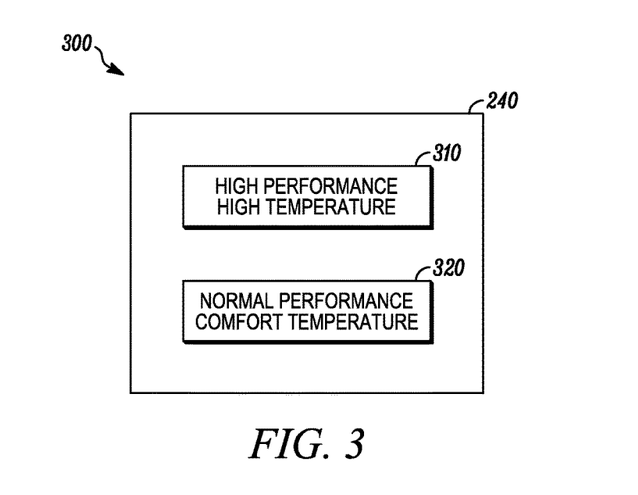
FIG. 3 is an example illustration of performance mode user input options according to a possible embodiment.

FIG. 3 is an example illustration of performance mode user input options 300 according to a possible embodiment. The performance mode user input options 300 can be displayed on the display 240. The performance mode user input options 300 can include a first performance mode 310 and a second performance mode 320. The first performance mode 310 can be a high performance and high temperature performance mode. The second performance mode 320 can be a normal performance and comfort temperature performance mode. The performance mode user input options 300 can include other performance mode options discussed above. A user can select a performance mode option 300 as a user input of a desired performance mode of the portable electronic device 200. In more detail, human perception of device surface temperature changes depending on surrounding ambient temperature and certain users do not want to hold devices with uncomfortably hot surfaces. However, some performance users may wish to allow their devices to run hotter to achieve higher device performance. Advantageously, this disclosure allows a device to adapt its temperature to compensate for both ambient temperature and the type of performance desired by the user.

Figure 4:
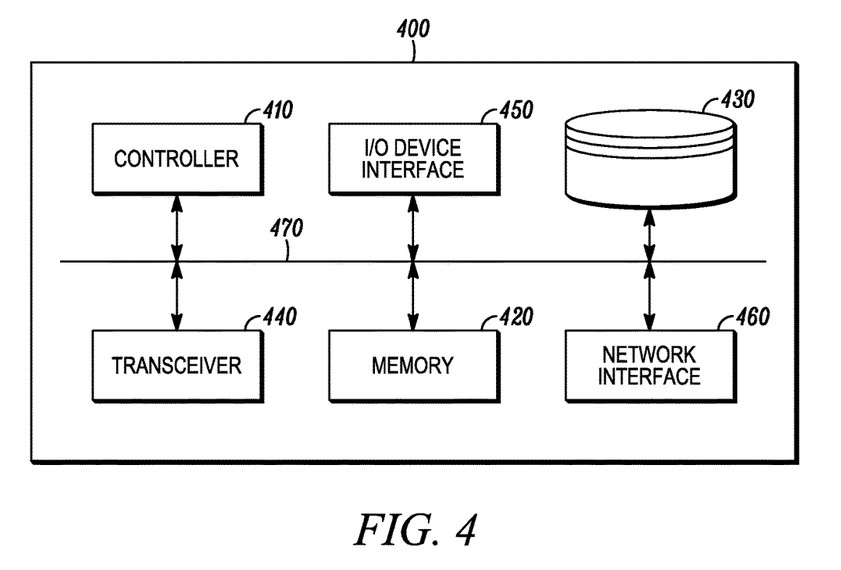
FIG. 4 is an example block diagram of a server according to a possible embodiment.

FIG. 4 is an example block diagram of a server 400, such as the server 140, according to a possible embodiment. The server 400 may include a controller 410, a memory 420, a database interface 430, a transceiver 440, Input/Output (I/O) device interface 450, a network interface 460, and a bus 470. The server 400 may implement any operating system, such as Microsoft Windows®, UNIX, or LINUX, for example. Base station operation software may be written in any programming language, such as C, C++, Java or Visual Basic, for example. Server software may run on an application framework, such as, for example, a Java® server, a .NET® framework, or any other application framework. The software and/or the operating system may be stored in the memory 420 or elsewhere on the server 400. The server 400 or the controller 410 may also use hardware to implement operations. For example, the controller 410 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or other devices that can implement the disclosed embodiments.

In operation, the server 400 can provide ambient temperature information to the apparatus 110. For example, the server 400 can be a weather service server or other server that can provide temperature information for a given location. The server 400 can also assist in providing apparatus position information to the apparatus 110. The server 400 can further assist the apparatus 110 in performing other operations discussed in other embodiments.

Figure 5:
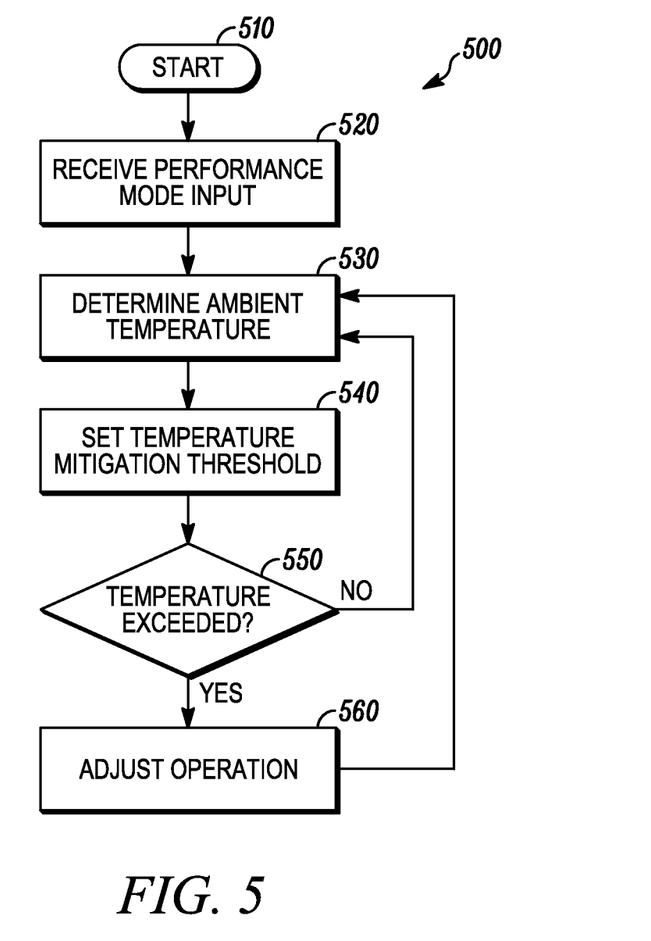
FIG. 5 is an example flowchart illustrating operation of an apparatus according to a possible embodiment.

FIG. 5 is an example flowchart 500 illustrating the operation of the apparatus 110, such as the portable electronic device 200, according to a possible embodiment. At 510, the flowchart 500 can begin. At 520, a user input of a desired performance mode of a portable electronic device can be received. The user input can be selected from performance mode user input options discussed above. At 530, an ambient temperature in an environment surrounding the portable electronic device can be determined. The ambient temperature can be determined based on the ambient temperature determinations discussed above. At 540, a device temperature mitigation threshold value can be set based on the ambient temperature and based on the desired performance mode. The device temperature mitigation threshold value can be set as discussed above. At 550, a determination can be made as to whether a portable electronic device temperature has exceeded the device temperature mitigation threshold value. At 560, portable electronic device operation can be adjusted if the portable electronic device temperature has exceeded the device temperature mitigation threshold value. The portable electronic device operation can be adjusted by reducing an operating frequency of the portable electronic device or by any of the other adjustments discussed above. When adjusting operation, the portable electronic device can display information informing a user that operation has been adjusted. Also, the device can display information that its temperature has exceeded the device temperature mitigation threshold and can ask the user whether it should enter a high ambient temperature performance mode which will result in high surface temperature. After adjusting portable electronic device operation at 560 or if the device temperature has not exceeded the device temperature mitigation threshold value, ambient temperature can continue to be monitored at 530. For example, while a device is in an ambient temperature performance mode, if the ambient temperature has returned to a normal temperature, a device can return to standard performance mode with a corresponding temperature mitigation threshold without asking a user as there is no longer an impact on the device temperatures. Thus, if the ambient temperature rises again, the device can enter a high ambient temperature performance mode and the device can return to a normal mode if the temperature returns to normal. For example, a user can select an option for a device to always run in a high performance mode when the ambient temperature is elevated. Additionally, if a performance mode is not selected permanently, then operations of the flowchart 200 can be implemented each time the device enters an elevated ambient temperature environment. Furthermore, user input may continue to be monitored for performance mode inputs. Also, the temperature changes can be monitored periodically. The frequency of monitoring temperature change may be based on time, based on motion, based on location, such as by limiting monitoring frequency or decreasing power drain based on navigation information, based on other factors, or based on a combination of the above factors. Additionally, a user may also select a permanent setting of performance mode so that the user is not asked again; hence, the device can enter the high performance mode at elevated ambient temperatures automatically.

Figure 6:
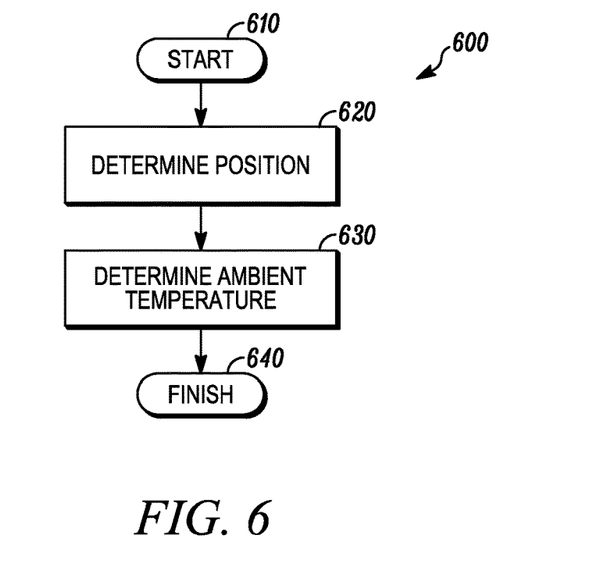
FIG. 6 is an example flowchart illustrating operation of an apparatus according to a possible embodiment.

FIG. 6 is an example flowchart 600 illustrating the operation of the apparatus 110, such as the portable electronic device 200, according to a possible embodiment. The operations of flowchart 600 can be incorporated into the operations of the flowchart 500. At 610, the flowchart 600 can begin. At 620, a position, such as a location, of the portable electronic device can be determined. The position of the portable electronic device can be determined based on the positioning determinations discussed above. For example, the position of the portable electronic device can be a geographic position, an indoor position, or other position of the portable electronic device. At 630, an ambient temperature in the environment surrounding the portable electronic device can be determined based on the determined position of the portable electronic device. The ambient temperature can be determined as discussed above, such as in step 530 of the flowchart 500. At 640, the flowchart 600 can end.

Figure 7:
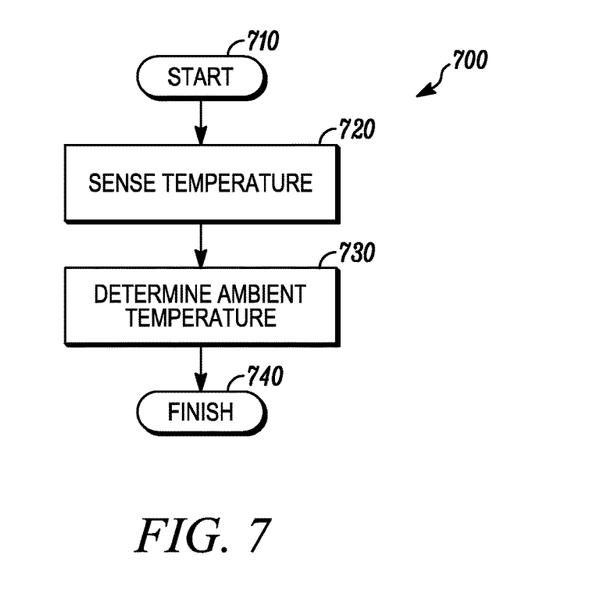
FIG. 7 is an example flowchart illustrating operation of an apparatus according to a possible embodiment.

FIG. 7 is an example flowchart 700 illustrating the operation of the apparatus 110, such as the portable electronic device 200, according to a possible embodiment. The operations of flowchart 700 can be incorporated into the operations of the flowchart 500. At 710, the flowchart 700 can begin. At 720, an ambient temperature can be sensed using at least one sensor on the portable electronic device. The ambient temperature can be sensed as discussed above. At 730, an ambient temperature can be determined based on the sensed ambient temperature, such as in step 530 of the flowchart 500. The ambient temperature can be determined as discussed above. At 740, the flowchart 700 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
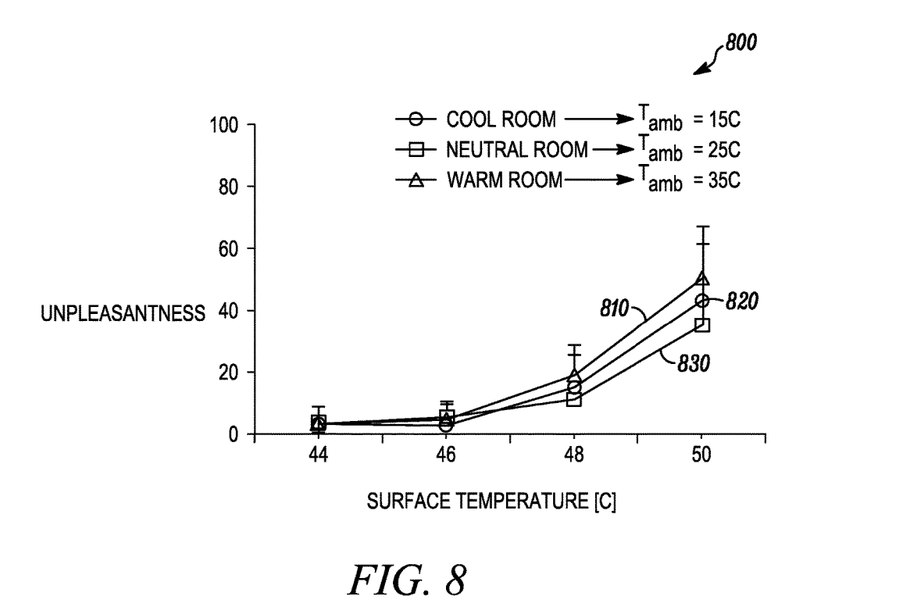
FIG. 8 is an example illustration of a graph of user perception of unpleasantness of a portable electronic device surface temperature according to a possible embodiment.

FIG. 8 is an example illustration a graph 800 of user perception of unpleasantness of a portable electronic device surface temperature according to a possible embodiment. The graph 800 illustrates how user perception of unpleasantness of surface temperature rises quicker when an ambient temperature is warmer 810 or cooler 820 than a normal or neutral temperature 830. For example, a user's perception of discomfort of a hot surface temperature increases at elevated and decreased ambient temperatures.

Figure 9:
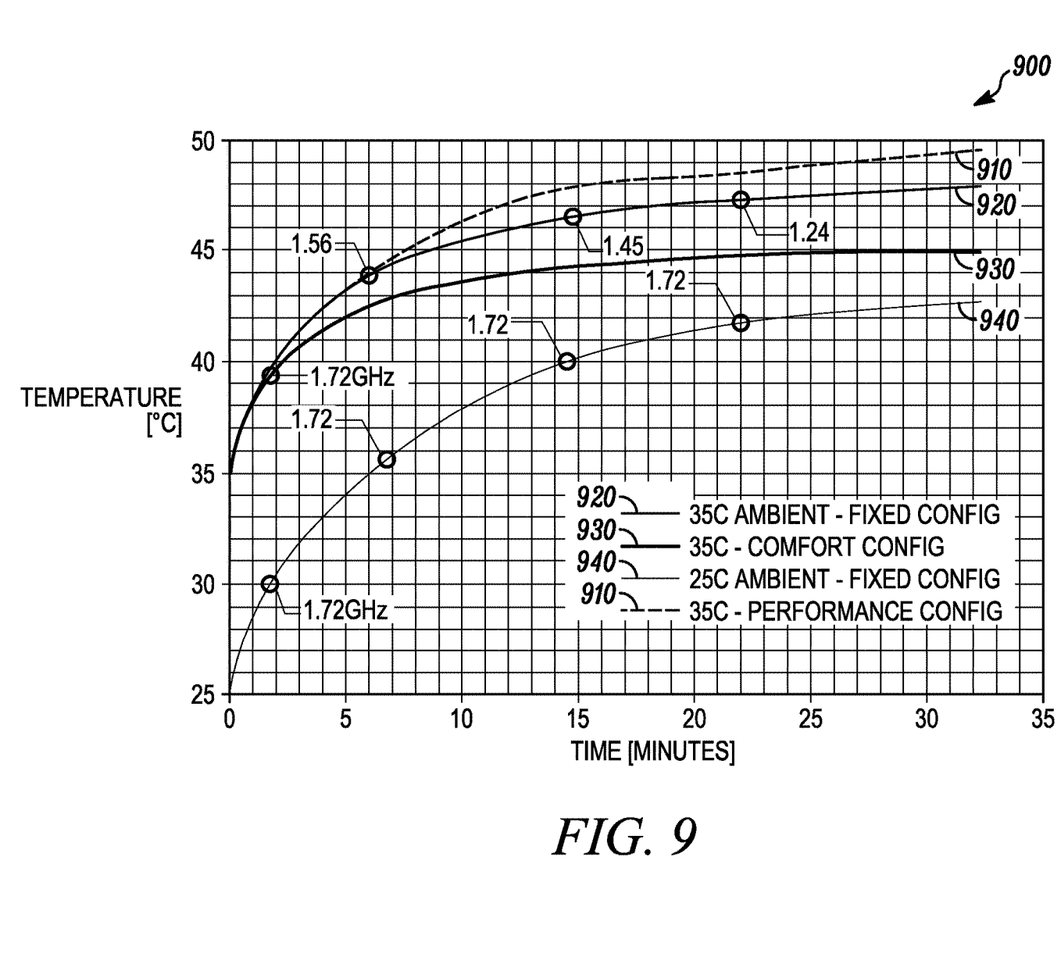
FIG. 9 is an example illustration of a graph of performance and comfort adaptive mitigation according to a possible embodiment.

FIG. 9 is an example illustration of a graph 900 of performance and comfort adaptive mitigation according to a possible embodiment. The graph 900 illustrates mitigation for a portable electronic device high performance configuration 910 at an elevated ambient temperature, fixed or normal configuration 920 at an elevated ambient temperature, comfort configuration 930 at an elevated ambient temperature, and fixed or normal configuration 940 at a normal ambient temperature. As shown, portable electronic device operation can be adjusted based on the portable electronic device temperature exceeding device temperature mitigation threshold values. For example, an operating frequency of the portable electronic device can be reduced over time from 1.72 GHz based on an elevated 35 degrees C. or normal 25 degrees C. ambient temperature and based on the performance mode configuration as the surface temperature of the portable electronic device gets hotter, such as above 35-50 degrees C., depending on the ambient temperature.

Figure 10:
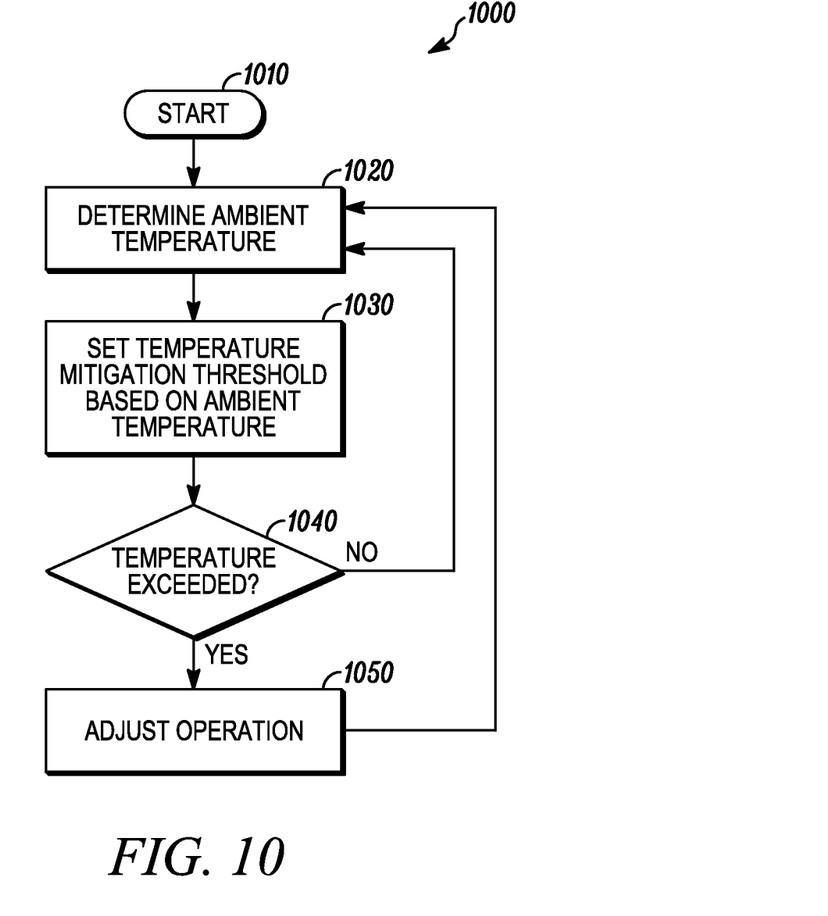
FIG. 10 is an example flowchart illustrating operation of an apparatus according to a possible embodiment.

FIG. 10 is an example flowchart 1000 illustrating the operation of the apparatus 110, such as the portable electronic device 200, according to a possible embodiment. The operations of flowchart 1000 incorporate operations of the flowchart 500. Also, operations of the flowchart 1000 can be performed after step 560 of the flowchart 500, such as regardless of a desired permanency of a performance mode setting or if a given performance mode is set as a permanent performance mode. At 1010, the flowchart 1000 can begin.

At 1020, an ambient temperature in an environment surrounding the portable electronic device can be determined, such as by monitoring ambient temperature. The ambient temperature can be determined as discussed in other embodiments. At 1030, a device temperature mitigation threshold value can be set based on the ambient temperature and/or based on the desired performance mode. The device temperature mitigation threshold value can be set as discussed in other embodiments. At 1040, a determination can be made as to whether a portable electronic device temperature has exceeded the device temperature mitigation threshold value. The determination can be made as discussed in other embodiments. If the device temperature mitigation threshold has been exceeded, at 1050, portable electronic device operation can be adjusted if the portable electronic device temperature has exceeded the device temperature mitigation threshold value. The portable electronic device operation can be adjusted as discussed in other embodiments. After adjusting portable electronic device operation at 1050 or if the temperature mitigation threshold has not been exceeded at 1040, operation can return to 1020 to continue to monitor ambient temperature changes continuously, as needed, as requested, or periodically, as discussed above.

Embodiments can provide adaptive thermal control that changes device temperature limits based on surface temperature unpleasantness. Embodiments can also provide proactive optimization to maximize device performance and time until mitigation. Embodiments can additionally provide for user specific thermal profile settings where surface temperature unpleasantness can be established based on the ambient temperature.

Some embodiments can maximize device performance while also managing device surface temperature to a level that is not unpleasant because the uncomfortable threshold for one person is not the same for someone else. Some embodiments can take into account user's comfort or performance type profiles and/or their association with a raised ambient temperature and device surface temperature unpleasantness. Some embodiments can expand a range of ambient temperatures $T_{amb}$ across which a comparable perceived performance is assured based on a user's needs. Some embodiments can allow a device to adjust a temperature mitigation limit and maximize time before the limit is reached while accounting for a user's perception of the temperature. For example, some embodiments can increase the time before the device reaches critical mitigation thresholds. Some embodiments can increase the time before overall shutdown of the device at maximum device critical temperature. Some embodiments can provide maximum usability to users when outdoors and away from a charging source and can increase battery life by improving current drain.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method comprising:
    receiving, by a computing device, a first user input, the first user input indicating a first desired performance mode of the computing device;
    estimating an ambient temperature in an environment surrounding the computing device;
    determining a first device temperature mitigation threshold value based on the estimated ambient temperature and based on the first desired performance mode, the first desired performance mode being a comfort-temperature mode;
    receiving a second user input, the second user input indicating a second desired performance mode, the second desired performance mode being a high-temperature mode;
    determining a second device temperature mitigation threshold value based on the estimated ambient temperature and based on the second desired performance mode;
    sensing, using one or more sensors of the computing device and in response to determining that a current temperature of the computing device differs from an expected temperature of the computing device for the estimated ambient temperature, an ambient temperature value;
    determining a third device temperature mitigation threshold value based on the sensed ambient temperature value and based on the second desired performance mode; and
    adjusting, in response to determining that the temperature of the computing device has exceeded the third device temperature mitigation threshold value, operation of the computing device.

2. The method according to claim 1, wherein adjusting operation of the computing device comprises reducing an operating frequency of the computing device.

3. The method according to claim 1, wherein the device temperature mitigation threshold values are further based on a predetermined device surface temperature of the computing device.

4. The method according to claim 1, further comprising determining a position of the computing device,
wherein estimating the ambient temperature comprises determining the estimated ambient temperature in the environment surrounding the computing device based on the determined position of the computing device.

5. The method according to claim 1, wherein sensing the ambient temperature value comprises sensing the ambient temperature value using at least one sensor on the computing device.

6. The method according to claim 1, further comprising determining that the computing device is indoors,
wherein estimating the ambient temperature includes determining that the estimated ambient temperature is an indoor ambient temperature.

7. The method of claim 1, wherein
estimating the ambient temperature is based on a current location of the computing device.

8. The method of claim 1, further comprising:
outputting for display, by the computing device and in response to determining that the temperature of the computing device has exceeded the third device temperature mitigation threshold value, an indication that the temperature of the computing device has exceeded the third device temperature mitigation threshold value; and
receiving a third user input indicating that the user desires temperature mitigation of the computing device.

9. The method of claim 1, wherein
the adjusting operation of the computing device comprises initiating temperature mitigation, and
the method further comprises:
outputting for display, by the computing device and in response to adjusting operation of the computing device, an indication that the computing device has initiated temperature mitigation;
receiving a third user input indicating that the user desires halting temperature mitigation of the computing device; and
readjusting operation of the computing device to discontinue temperature mitigation.

10. The method of claim 1, wherein:
estimating the ambient temperature is based on a location of the computing device;
the method further comprises outputting for display, by the computing device and in response to determining that the temperature of the computing device has exceeded the first device temperature mitigation threshold value and before receiving the second user input, an indication that the computing device is proceeding to enter a temperature mitigation mode; and
the second user input overrides the temperature mitigation mode.

11. A computing device comprising:
a user input interface configured to receive a first user input indicating a desired first performance mode of the computing device, and a second user input overriding a temperature mitigation mode and indicating a second desired performance mode;
one or more sensors;
a controller coupled to the user input interface, the controller configured to:
estimate an ambient temperature in an environment surrounding the computing device,
determine a first device temperature mitigation threshold value based on the estimated ambient temperature and based on the first desired performance mode, the first desired performance mode being a comfort-temperature mode,
determine a second device temperature mitigation threshold value based on the estimated ambient temperature and based on the second desired performance mode, the second desired performance mode being a high-temperature mode;
control the one or more sensors, in response to determining that a current temperature of the computing device differs from an expected temperature of the computing device for the estimated ambient temperature, to sense an ambient temperature value,
determine a third device temperature mitigation threshold value based on the sensed ambient temperature value and a current desired performance mode, and
adjust, in response to determining that the temperature of the computing device has exceeded the third device temperature mitigation threshold value, operation of the computing device.

12. The computing device according to claim 11, wherein the controller is configured to adjust the operation of the computing device by reducing an operating frequency of the computing device.

13. The computing device according to claim 11, wherein the second device temperature mitigation threshold value is further based on a predetermined device surface temperature of the computing device.

14. The computing device according to claim 11, wherein the controller is configured to determine the device temperature mitigation threshold values by adjusting the device temperature mitigation threshold values in response to the estimated ambient temperature being outside a range of ambient temperature values.

15. The computing device according to claim 11, wherein the controller is further configured to:
determine a position of the computing device, and
estimate the ambient temperature in the environment surrounding the computing device based on the determined position of the computing device.

16. The computing device according to claim 11, wherein the controller is further configured to, in response to determining that the computing device is indoors, estimate the ambient temperature in the environment surrounding the computing device as an indoor ambient temperature.

17. A method comprising:
receiving a first user input indicating a first desired performance mode of a computing device, the first desired performance mode indicating a first desired processing power of the computing device;
estimating, based on a location of the computing device, an ambient temperature in an environment surrounding the computing device;
determining a first device surface temperature mitigation threshold value based on the estimated ambient temperature and based on the first desired performance mode;
sensing, using one or more sensors and in response to determining that a current temperature of the computing device differs from an expected temperature for the estimated ambient temperature, an ambient temperature value;

determining a second device surface mitigation temperature threshold value based on the sensed ambient temperature value and based on the first desired performance mode;

in response to determining that a surface temperature of the computing device is greater than the second device surface temperature mitigation threshold value, adjusting operation of the computing device to reduce the surface temperature of the computing device;

receive, after adjusting the operation of the computing device, a second user input indicating a second desired performance mode of a computing device, the second desired performance mode indicating a second desired processing power of the computing device;

determining a third device surface mitigation temperature threshold value based on the sensed ambient temperature value and based on the second desired performance mode; and in response to determining that a surface temperature of the computing device is less than the third device surface temperature mitigation threshold value, adjusting operation of the computing device to increase the processing power of the computing device.

18. The method of claim 17, further comprising:

outputting for display, by the computing device and in response to determining that the temperature of the computing device has exceeded the third device surface mitigation temperature threshold value, an indication that the temperature of the computing device has exceeded the third device surface mitigation temperature threshold value; and receiving a third user input indicating that the user desires temperature mitigation of the computing device.

19. The method of claim 17, wherein:

the adjusting operation of the computing device comprises initiating temperature mitigation, and the method further comprises:

outputting for display, by the computing device and in response to adjusting operation of the computing device, an indication that the computing device has initiated temperature mitigation;

receiving a third user input indicating that the user desires halting temperature mitigation of the computing device; and readjusting operation of the computing device to discontinue temperature mitigation.

20. The method of claim 17, wherein:

the method further comprises outputting for display, by the computing device and in response to determining that the temperature of the computing device has exceeded the first device temperature mitigation threshold value and before receiving the second user input, an indication that the computing device is proceeding to enter a temperature mitigation mode; and the second user input overrides the temperature mitigation mode.

* * * * *